Nov. 22, 1966 H. R. BEEBE 3,287,020

SOUND REPRODUCING DEVICE FOR A DOLL OR THE LIKE

Filed Sept. 9, 1963 2 Sheets-Sheet 1

INVENTOR
HERBERT R. BEEBE
BY Berman & Berman
ATTORNEYS

SOUND REPRODUCING DEVICE FOR A DOLL OR THE LIKE

Filed Sept. 9, 1963 2 Sheets-Sheet 2

INVENTOR
HERBERT R. BEEBE
BY
ATTORNEYS

United States Patent Office 3,287,020

Patented Nov. 22, 1966

3,287,020

SOUND REPRODUCING DEVICE FOR A DOLL OR THE LIKE

Herbert R. Beebe, Sayville, N.Y., assignor to American Character, Inc., a corporation of New York Filed Sept. 9, 1963, Ser. No. 307,437
8 Claims. (Cl. 274—9)

This invention relates to sound reproducing devices and, in particular, to electrically driven play back instruments of the phonograph type which are uniquely designed for adaptation as a toy.

One object of the invention is to provide a toy phonograph which though electrically driven may be operated safely and simply by a child.

In keeping with the general object of invention as above set forth, there is provided a motor driven phonograph the sound reproducing components of which serve also in part to activate and deactivate the motor. In particular, the tone arm of the device with its stylus secured thereby in starting position is by virtue thereof additionally in switch engaging position whereby the device is activated. The tone arm is spring loaded and is releasable to this position by axially adjusting the position of the turntable which holds the arm in off position at the end of each play back to deactivate the device. A more detailed description of the invention taken in conjunction with the accompanying drawings follows.

Figures 1, 2, 3:
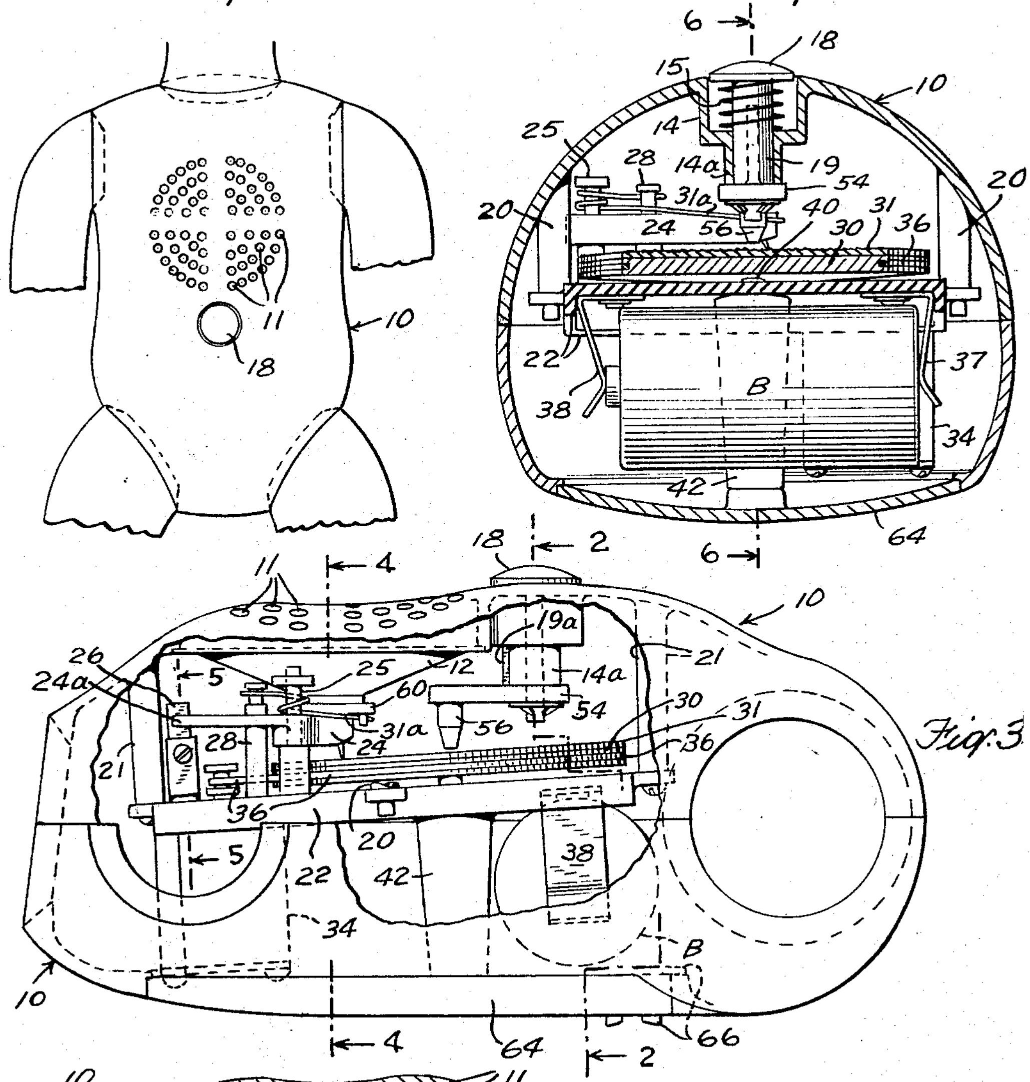
FIGURE 1 shows a doll torso adapted to house the sound reproducing mechanism.
FIGURE 2 is an enlarged section taken on the stepped line 2—2 of FIGURE 3 showing the operative elements for the turntable and tone arm components in the mechanism.
FIGURE 3 is a side elevation of the doll body with part of the casing broken away to show the various components of the sound reproducing mechanism.
Figure 4:
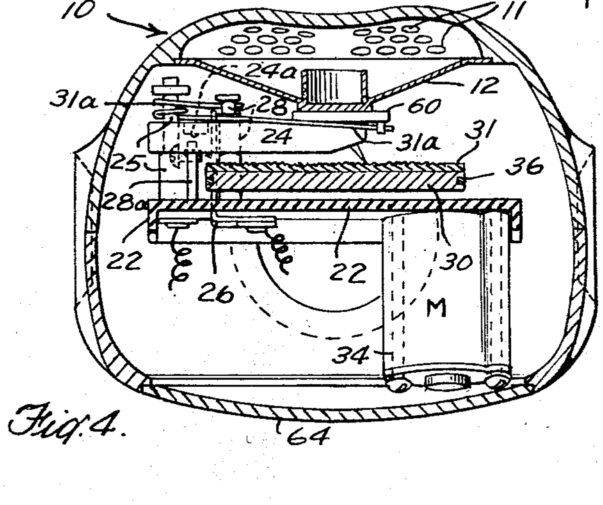
FIGURE 4 is a section taken on the line 4—4 of FIGURE 3.
Figure 5:
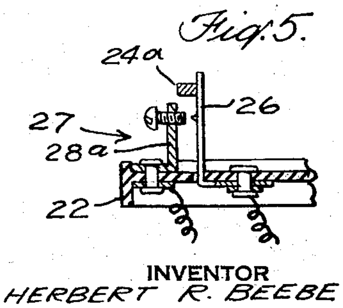
FIGURE 5 is a section taken on line 5—5 of FIGURE 3 showing a detail of the motor switch.

Referring to the drawings, there is shown in FIGURE 1 a doll torso or body 10 within which the sound reproducing mechanism described below is housed. It is understood, however, that the mechanism may be disposed in a housing of other type or conformation, providing the housing has sufficient dimension to accommodate the various operating components of the mechanism.

As shown in FIGURE 1 the doll torso is provided with perforations 11 in the chest region, and there is supported within the doll proximate the perforations a diaphragm 12 fabricated of acetate or other thermo-plastic which is sealed at its periphery to the underside of the doll casing around the perforations 11. The front of the doll torso or body 10 is apertured and communicating therewith within the body is as cylindrical member 14 having an axial extension 14*a* of reduced diameter the juncture of which provides a seat for helical spring 15 disposed in the member 14. A push button 18 is receivable within the cylindrical member 14, and has a shank 19 extending through the coils of the spring 15 and the extension 14*a*. The shank 19 has an integral key 19*a* engaging a slot in the extension 14*a*.

There is supported by posts 20 and 21 depending from the body 10 a plate 22 which supports the operative moving elements of the sound reproducing mechanism. For a reason that will be later explained the plate 22 is supported slightly out of parallel with the longitudinal axis of the doll body.

Figures 8, 9:
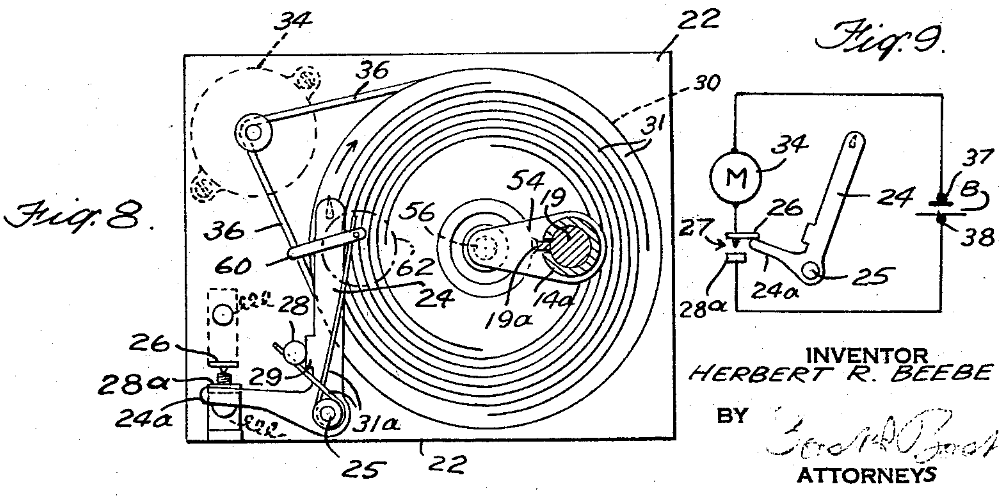
FIGURE 8 is a section similar to FIGURE 7 showing the tone arm in start position.
FIGURE 9 is a circuit diagram for the motor driven turntable.

A spring biased tone arm 24 is pivotally mounted on post 25 and is provided with an extension 24*a* which is adapted to engage on pivoting a yieldable terminal 26 of motor switch 27 which is in normal contact with rigid terminal 28*a*. The latter has an adjustable screw for varying the gap between terminals. The tone arm is enabled to open the switch 27 when it is swung over the center of the plate 22 and turntable 30 supported thereby. Between the arm and its extension is erected a post 28 which is engaged by a lateral projection 29 on the arm when the arm is swung to a start position. Desirably the record 31 on the turntable has several start positions each located the same distance radially from the record rim and the doll or the like is enabled thereby to utter any one of several phrases depending on which one of the several independent grooves is closest to the stylus when the tone arm is placed in starting position against post 28 as shown in FIGURE 8. The spring bias on the tone arm is furnished by spring 31*a* which engages the stylus end of the arm at one other end, the end engaging the post 28 and being intermediately wrapped about post 25. The turntable 30 is driven by motor 34, which is supported underneath the plate 22, through belt 36 running in a groove in the turntable and a pulley wheel mounted on the motor's armature. As shown in FIGURE 9 one side of the motor is connected to the yieldable terminal 26 of the switch 27, while the other side is connected to a terminal 37, shown in FIGURE 2, for the battery B, the other battery terminal 38 of which is connected to the switch terminal 28*a*.

The turntable 30 is provided with an axial shaft 40 which extends through a bushing lined aperture in the plate 22 and into the bore of bearing extension 42 depending from the plate. The end of the shaft is provided with a thrust bearing element 44 which is disposed in a small central depression in a spring back disc 46. One end of coil spring 48 in the bottom of the casing bore is made secure to an axial projection of the disc 46, the other end being attached in the same manner to bottom disc 50. A set screw 52 in a tapped hole in the bottom of the bearing extension 42 serves to adjust the spring pressure on the end of the shaft 40 and, hence, the upward thrust of the turntable against the stylus retained by the tone arm.

Secured to the shank 19 of the push button 18 is a horizontally disposed arm 54, from the end portion of which over the center of the turntable there depends a turntable depressing member 56. Pushing down on the button 18, the tapered end of the member 56 is adapted to engage an aperture in the top surface of a record supporting central raised portion 58 of the turntable and depress the turntable against the spring 48 in the bearing extension 42. When the push button 18 is released the turntable rises until the record supported thereon strikes the stylus of the tone arm.

The stylus end of the tone arm supports on its top surface a slide bar 60 which for the purpose of transmitting sound vibrations picked up from the stylus, engages a plastic push button 62 cemented to the apex of the diaphragm 12. The pivotal mounting of the tone arm on the post 25 is somewhat loose permitting the tone arm to sweep in either direction horizontally under the guidance of the slide bar 60 against the plastic push button 62. Accordingly, a clearance is assured between the tone arm needle and the record grooves as the spring biased arm is pivoted to a start position over the depressed turntable.

The bottom of the doll casing is provided with a removable plate 64 having a fixed clasp 65 on one side thereof adapted to fit over one edge of an access opening in the casing and a turn latch 66 adapted to overlie in lock position an opposing edge of the opening.

In operation the button 18 is depressed to move the turntable downwardly to compress its spring. This releases the tone arm 24 which is swung by its spring to the starting position so as to close the circuit with the battery and motor and start the turning of the turntable and disc thereon. Upon release of the button the turntable is moved upwardly by its spring and makes engagement with the needle of the tone arm, permitting the tone arm to slide across the diaphragm with the movement of the needle in the track or groove of the record to thereby produce the sound by the diaphragm. The make and break switch with the motor and battery is actuated by the extension of the tone arm to open and close the circuit. The distance across the gap in the make and break switch is adjustable by a screw at the side and the tension on the turntable is adjustable by the screw 52 at the rear.

Figure 6:
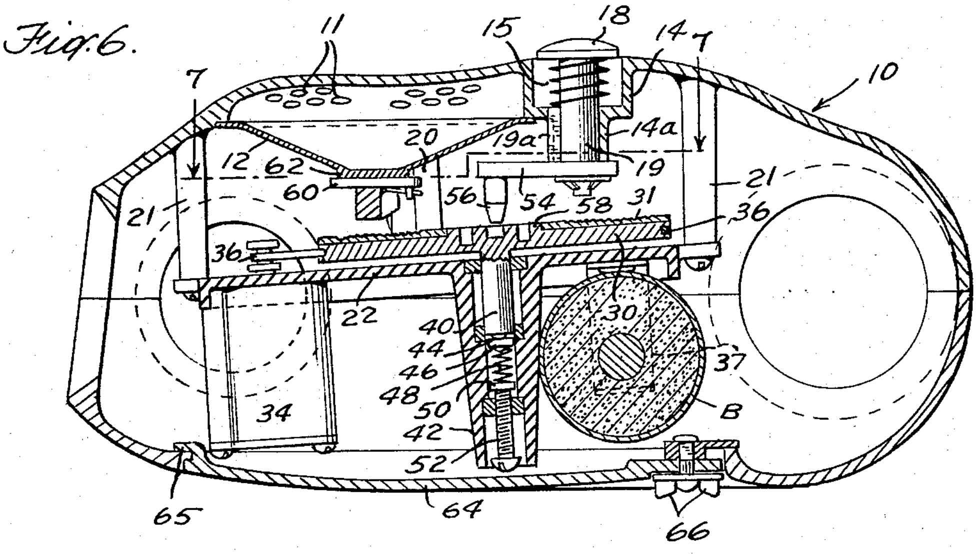
FIGURE 6 is a section taken on the line 6—6 of FIGURE 2.
Figure 7:
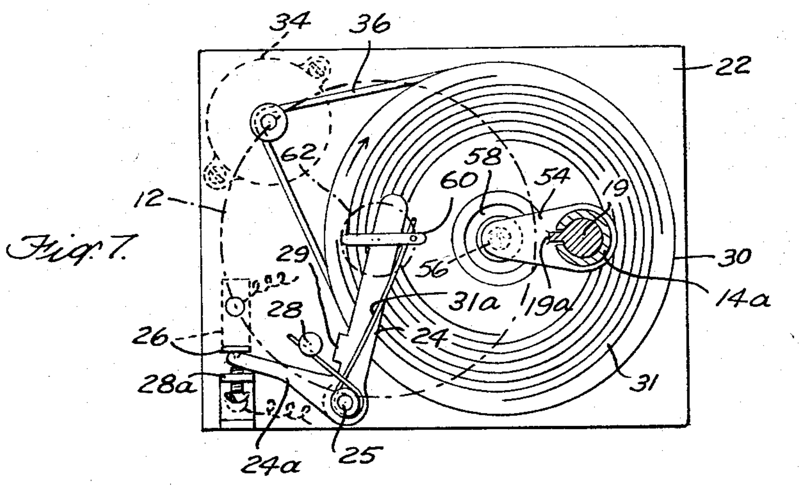
FIGURE 7 is a section in plan taken on the line 7—7 of FIGURE 6 showing the tone arm in off position.

When the doll is erect the stylus pressure is greater than when the doll is supine, and to help overcome this, the turntable is tilted with respect to the longitudinal axis of the doll body. With the head at the left as shown in FIGS. 3 and 6, the tilt is in the direction there shown. This reduces the increase in stylus pressure which otherwise would occur when the doll is erect, because the compression spring 48 (FIG. 6) must then push the turntable and spindle upward somewhat, instead of the spindle being horizontal with no gravitational force opposing the spring.

While the invention has been described in conjunction with that of a doll torso, it is understood that it may have other applications particularly in the toy field. Various modifications of the invention may be effected by persons skilled in the art within the scope and principle of the invention without departing from the scope of the claims.

What is claimed is:

1. A battery-operated toy phonograph adapted to be housed in a toy such as a doll, said phonograph comprising a diaphragm, a turntable generally parallel to the diaphragm, a grooved record on said turntable, a stylus arm pivoted for movement in a plane between the turntable and the diaphragm, resilient means lightly urging the stylus arm outward to a position over the beginning of the record grooves, a slide means between the stylus arm and the diaphragm for transmitting vibration to the diaphragm as the stylus arm travels from outer position to inner position, an electric motor for driving the turntable, a cell of the flashlight type, a circuit between the cell and the motor, means mounting the turntable for axial movement away from the stylus arm to free said stylus arm for outward movement to starting position, resilient means urging the turntable toward the stylus arm, a leaf spring switch in said motor circuit and so disposed that on movement to the innermost grooves at the end of the record a part of the stylus arm bears against the leaf spring and opens the switch and holds it open to prevent drain of the battery, whereas outward movement of the stylus arm permits the switch to close and operate the motor, and an externally accessible control means to momentarily move the turntable away from the stylus arm when it is desired to start the photograph.

2. A toy phonograph as defined in claim 1 in which the control means is a push button which is exposed at a point outside the diaphragm, and is provided with an angle arm and a finger offset a substantial distance from the button to a point over the center of the turntable.

3. A toy phonograph as defined in claim 1 in which the turntable has a spindle, and in which the resilient means urging the turntable toward the stylus arm is a compression spring disposed beneath the end of the turntable spindle, and in which the outer end of the compression spring rests on the inner end of a screw, the outer end of said screw having a head which is externally accessible for adjustment of the stylus pressure.

4. A toy phonograph as defined in claim 1 in which the leaf spring of the motor switch engages the end of a screw acting as a stationary contact, the said screw being adjustable to adjust the radius on the record at which the switch opens.

5. A doll comprising a doll body, and a toy phonograph as defined in claim 1, said phonograph being so mounted in the doll body that the turntable is tilted with respect to the longitudinal axis of the doll body, the tilt being in upward direction when the doll is erect so that the turntable tends to gravitationally oppose the resilient means urging it toward the stylus arm.

6. A battery-operated toy phonograph adapted to be housed in a toy such as a doll, said phonograph comprising a diaphragm, a turntable generally parallel to the diaphragm, a grooved record on said turntable, a stylus arm pivoted for movement in a plane between the turntable and the diaphragm, resilient means lightly urging the stylus arm outward to a position over the beginning of the record grooves, a slide means between the stylus arm and the diaphragm for transmitting vibration to the diaphragm as the stylus arm travels from outer position to inner position, means mounting the turntable for axial movement, resilient means urging the turntable toward the stylus arm, a pushbutton which is exposed at a point outside the periphery of the diaphragm, the inner end of said button carrying an angle arm and a finger which is offset a substantial distance from the button to a point over the center of the turntable, and resilient means urging the button and finger away from the turntable, whereby said button may be used to momentarily move the turntable away from the stylus arm to free it for outward movement to starting position.

7. A doll comprising a doll body, and a toy phonograph as defined in claim 6, said phonograph being so mounted in the doll body that the turntable is tilted with respect to the longitudinal axis of the doll body, the tilt being in upward direction when the doll is erect so that the turntable tends to gravitationally oppose the resilient means urging it toward the stylus arm.

8. A battery-operated toy phonograph adapted to be housed in a toy such as a doll, said phonograph comprising a diaphragm, a turntable generally parallel to the diaphragm, a grooved record on said turntable, a stylus arm pivoted for movement in a plane between the turntable and the diaphragm, resilient means lightly urging the stylus arm outward to a position over the beginning of the record grooves, a slide means between the stylus arm and the diaphragm for transmitting vibration to the diaphragm as the stylus arm travels from outer position to inner position, an electric motor for driving the turntable, a cell of the flashlight type, a circuit between the cell and the motor, means mounting the turntable for axial movement away from the stylus arm to free said stylus arm for outward movement to starting position, resilient means urging the turntable toward the stylus arm, a leaf spring switch in said motor circuit and so disposed that on movement of the stylus arm to the innermost grooves at the end of the record a part of the phonograph bears against the leaf spring and opens the switch and holds it open to prevent drain of the battery, whereas axial movement of the turntable away from the stylus arm to free the stylus arm for outward movement permits the switch to close and operate the motor, and an externally accessible control means to momentarily move the turntable away from the stylus arm when it is desired to start the phonograph.

References Cited by the Examiner

UNITED STATES PATENTS

| | | | |
|---|---|---|---|
| 2,552,757 | 5/1951 | Adler et al. | 274—14 X |
| 2,780,466 | 2/1957 | Like | 274—14 |
| 3,030,114 | 4/1962 | Jauquet | 274—15 X |
| 3,165,320 | 1/1965 | Ryan | 274—9 X |

NORTON ANSHER, *Primary Examiner.*

J. F. PETERS, Jr., *Assistant Examiner.*